(12) United States Patent
Zhao et al.

(10) Patent No.: US 11,138,403 B2
(45) Date of Patent: Oct. 5, 2021

(54) FINGERPRINT MODULE AND ELECTRONIC DEVICE

(71) Applicant: HONOR DEVICE CO., LTD., Guangdong (CN)

(72) Inventors: Kuibing Zhao, Beijing (CN); Wenping Guo, Shenzhen (CN); Dong Ma, Beijing (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 16/304,804

(22) PCT Filed: May 27, 2016

(86) PCT No.: PCT/CN2016/083755
§ 371 (c)(1),
(2) Date: Nov. 27, 2018

(87) PCT Pub. No.: WO2017/201755
PCT Pub. Date: Nov. 30, 2017

(65) Prior Publication Data
US 2020/0320268 A1 Oct. 8, 2020

(51) Int. Cl.
*G06K 9/00* (2006.01)
*H04M 1/02* (2006.01)

(52) U.S. Cl.
CPC ........ *G06K 9/00013* (2013.01); *H04M 1/026* (2013.01)

(58) Field of Classification Search
CPC .......................... G06K 9/00013; H04M 1/026
See application file for complete search history.

(56) References Cited

U.S. PATENT DOCUMENTS

| 2012/0086635 A1* | 4/2012 | Park | G06F 3/03548 345/157 |
| 2013/0162531 A1* | 6/2013 | Lin | G06F 3/03548 345/157 |

(Continued)

FOREIGN PATENT DOCUMENTS

| CN | 104408434 A | 3/2015 |
| CN | 104767513 A | 7/2015 |

(Continued)

OTHER PUBLICATIONS

Extended European Search Report and Written Opinion issued in European Application No. 16902744.8 dated Apr. 26, 2019, 9 pages.

(Continued)

*Primary Examiner* — Stephen G Sherman
(74) *Attorney, Agent, or Firm* — Fish & Richardson P.C.

(57) ABSTRACT

A fingerprint module includes a fingerprint component, a button component, a support, and a resilient fixing element. The button component is fastened to a lower surface of the fingerprint component. The resilient fixing element is disposed on the lower surface of the fingerprint component and is located between the fingerprint component and the support. The resilient fixing element surrounds the button component, and the resilient fixing element resiliently connects the fingerprint component and the support. There is a gap between the button component and the support. When the fingerprint component is pressed, the resilient fixing element deforms, the gap becomes smaller, and the button component comes in contact with the support.

20 Claims, 2 Drawing Sheets

(56) References Cited

U.S. PATENT DOCUMENTS

| | | | |
|---|---|---|---|
| 2013/0307818 A1 | 11/2013 | Pope et al. | |
| 2014/0285955 A1 | 9/2014 | Matsumoto | |
| 2015/0245514 A1 | 8/2015 | Choung et al. | |
| 2015/0294135 A1* | 10/2015 | Kim | G06K 9/00053 382/124 |
| 2017/0243705 A1* | 8/2017 | Bae | H01H 13/06 |

FOREIGN PATENT DOCUMENTS

| | | |
|---|---|---|
| CN | 204883484 U | 12/2015 |
| CN | 105373778 A | 3/2016 |
| CN | 205356427 U | 6/2016 |
| EP | 2911169 A2 | 8/2015 |
| KR | 100838665 B1 | 6/2008 |

OTHER PUBLICATIONS

International Search Report and Written Opinion issued in International Application No. PCT/CN2016/083755 dated Mar. 1, 2017, 18 pages.

Office Action issued in Chinese Application No. 201680025129.5 dated Aug. 21, 2019, 8 pages.

\* cited by examiner

FINGERPRINT MODULE AND ELECTRONIC DEVICE

CROSS REFERENCE TO RELATED APPLICATIONS

This application is a national stage of International Application No. PCT/CN2016/083755, filed on May 27, 2016, which is hereby incorporated by reference in its entirety.

TECHNICAL FIELD

This application relates to a fingerprint module of an electronic device, and in particular, to a fingerprint module and an electronic device that combine a button and a fingerprint function.

BACKGROUND

A fingerprint recognition module with a button is capable of implementing multiple extended functions, such as pressure-sensitive fingerprint unlocking and key triggering, and has been more widely applied to a Home key or the like in the terminal field. Improving a delicate structure of an entire mobile phone and a hand feeling of pressing a fingerprint button imposes a new challenge on a structure design. Implementation of the fingerprint button and the hand feeling of pressing the fingerprint button requires a relatively large quantity of related parts and complicated assembly, and a relatively long structure chain leads to a poor hand feeling. In addition, a hand feeling test cannot be performed on a pressure-sensitive fingerprint button before the entire mobile phone is assembled. This increasingly becomes a design bottleneck, and it is very difficult for a conventional solution in the prior art to meet a project requirement.

SUMMARY

A technical problem to be resolved in embodiments of this application is to provide a fingerprint module whose assembly in a production line is simplified and whose fingerprint module hand feeling can be tested before assembly.

According to a first aspect, this application provides a fingerprint module, including a fingerprint component, a button component, a support, and a resilient fixing element, where the button component is fastened to a lower surface of the fingerprint component; the resilient fixing element is disposed on the lower surface of the fingerprint component and is located between the fingerprint component and the support, the resilient fixing element surrounds the button component, and the resilient fixing element resiliently connects the fingerprint component and the support. There is a gap between the button component and the support. When the fingerprint component is pressed, the resilient fixing element deforms, the gap becomes smaller, and the button component comes in contact with the support. In this application, the fingerprint component and the button component are integrated into the fingerprint module, and the support and the fingerprint component are combined by using the resilient fixing element. In this case, before the fingerprint component is assembled into the electronic device, a hand feeling of pressing the button component can be tested. This ensures that assembly is performed only after a desired test result is obtained. In addition, an integrated structure simplifies an assembly process for a production line, and using an integrated module as an incoming material helps reduce related parts that are required during assembly of the fingerprint module. During the assembly, the support is directly fastened to a touchscreen, a battery cover, or a rear cover. Moreover, the button component is mounted onto the fingerprint component by using an SMT technology, so that there is no gap between the button component and the fingerprint component. This can reduce a stuck fingerprint button or a back-lash upon pressing. The fingerprint component is connected to the touchscreen, the battery cover, or the rear cover of the electronic device by using the support of the fingerprint component. The support not only has a mounting and fastening function, but also is used to come in contact with the button component during a pressing process, so as to form a movement path for the button component, and provide a user with a hand feeling.

In an implementation, the support includes a main body, a fixing rim, and a connecting arm, the connecting arm is connected between the main body and the fixing rim, the fixing rim is configured to connect to another element of the electronic device, and the main body is disposed opposite to the button component. In this implementation, the connecting arm bends at an edge of the main body in a direction facing the fingerprint component, the connecting arm may be perpendicular to a surface on which the main body is located, the fixing rim bends at an edge that is of the connecting arm and that is away from the main body, and the fixing rim and the main body are separately located on two ends of the connecting arm. In this implementation, the support is fastened to the touchscreen, the battery cover, or the rear cover of the electronic device by using the fixing rim. The support may be integrally molded by using a sheet metal part.

Specifically, an adhesive overflow groove is disposed on the fixing rim, and is configured to fasten the support to the another element (the touchscreen, the battery cover, or the rear cover) of the electronic device in a manner of adhesive dispensing. An adhesive dispensing technology not only helps reduce a mounting gap or tolerance between the fingerprint module and the another element, but also can make use of waterproof sealing performance of a sealing sealant to improve waterproof sealing performance of the fingerprint module and enhance lifetime and security of the fingerprint module.

Further, the connecting arm surrounds the main body and forms an enclosure along with the main body, and the button component and the resilient fixing element are both accommodated in the enclosure. That is, the connecting arm forms a ring-shaped structure, the main body is located at the bottom of the connecting arm, and the fixing rim is formed on an external side of the top of the connecting arm.

In an implementation, the support is an integrally-molded metal structure, and an insulation layer is disposed on a surface that is of the main body and that is not in contact with the fingerprint component. In an implementation, the insulation layer is an insulation sheet, such as a mylar (Mylar) sheet, the insulation layer is adhered to a surface of the main body by using an adhesive, or the insulation layer may be formed on the surface of the main body in a manner of disposing an insulation coating. The insulation layer is used to isolate the support from an electronic element or a mainboard inside the electronic device, so as to prevent static electricity from passing through the support and destroying the electronic element or the mainboard.

In an implementation, the fingerprint component includes a circuit board and a fingerprint recognition chip that is disposed on the circuit board, a surface that is of the fingerprint recognition chip and that is not in contact with the circuit board is a pressing surface, and a surface that is of the circuit board and that is not in contact with the fingerprint recognition chip is a mounting surface (namely the lower surface). The fingerprint module further includes a flexible circuit board, one end of the flexible circuit board is electrically connected to the circuit board, and the button component is connected to the mainboard of the electronic device by using the circuit board and the flexible circuit board. In this implementation, the fingerprint recognition chip and the button component are separately disposed on two sides of the circuit board. This may be directly fabricated by using an SMT technology, so that the fingerprint recognition chip and the button component are integrated as a whole.

An outlet is disposed on the support, the outlet is used by the flexible circuit board to extend from the circuit board to an external side of the support, and the outlet is filled with a sealing material, so that a waterproof structure is formed between the flexible circuit board and the support. Specifically, the flexible circuit board is configured to connect the circuit board and the mainboard or another electronic element of the electronic device. A drive circuit configured to drive the fingerprint recognition chip is disposed on the flexible circuit board.

The fingerprint component further includes a metal ring, the metal ring is disposed on a periphery of the fingerprint recognition chip, a portion of the metal ring is fastened to the circuit board, a portion of the metal ring wraps an edge area that is of the fingerprint recognition chip and that is on a side away from the circuit board. The metal ring and the circuit board are fastened by using a conductive adhesive, so that the metal ring is electrically connected to a ground end of the circuit board. The metal ring can not only protect an edge of the fingerprint recognition chip, but also has a decoration effect. In addition, the metal ring can further absorb static electricity of a human body, to prevent the static electricity from disturbing and destroying the fingerprint recognition chip.

The resilient fixing element is waterproof rubber (rubber), the waterproof rubber surrounds the button component, the waterproof rubber and the fingerprint component are fastened by using a waterproof adhesive, and the waterproof rubber and the support are also fastened by using a waterproof adhesive. A cross section of the resilient fixing element may be in a shape of a Chinese character "几" or may be in a "Z" shape. An end face of the resilient fixing element is fastened to a surface of the circuit board of the fingerprint component by using a waterproof adhesive.

Specifically, the fingerprint module is generally of a disk-shaped structure (excluding the flexible circuit board), the fingerprint component of the fingerprint module is disk-shaped, and the resilient fixing element is ring-shaped.

According to a second aspect, this application further provides an electronic device, including the fingerprint module according to any one of the foregoing implementations.

In this application, the fingerprint component and the button component are connected to the support by using the resilient fixing element, so that assembly in a production line is simplified and a hand feeling of the fingerprint module can be tested before the assembly. The fingerprint module in this application is applied to the electronic device. This helps the electronic device become lighter and thinner, also simplifies assembly of the electronic device, and reduces assembly costs.

BRIEF DESCRIPTION OF DRAWINGS

To describe the technical solutions in the embodiments of this application or in the prior art more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

Figure 1:
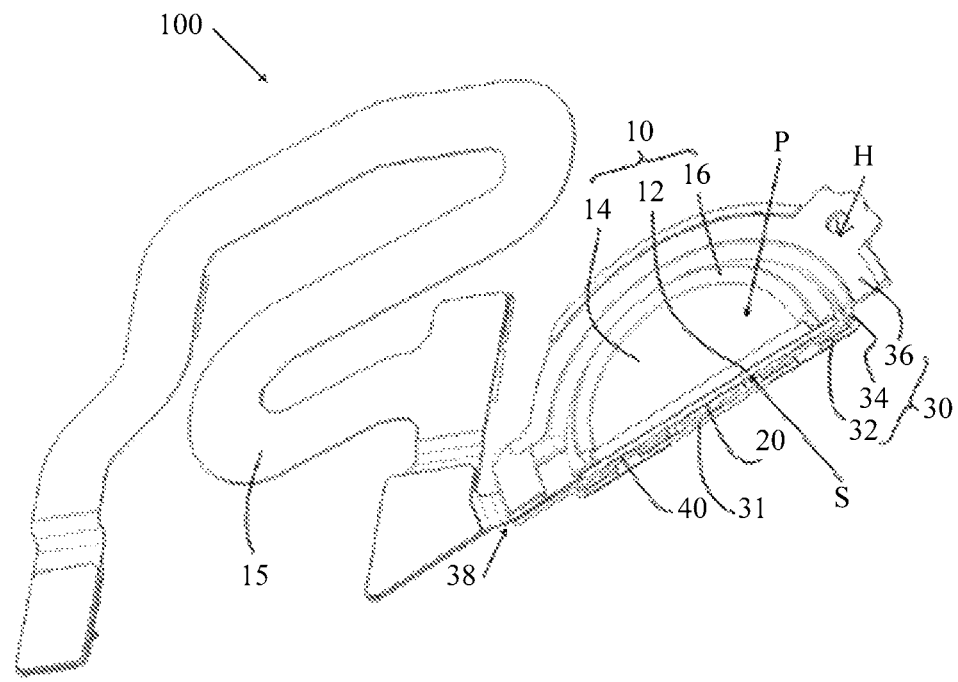
FIG. 1 is a schematic 3D diagram of a fingerprint module according to an implementation of this application.
Figure 2:
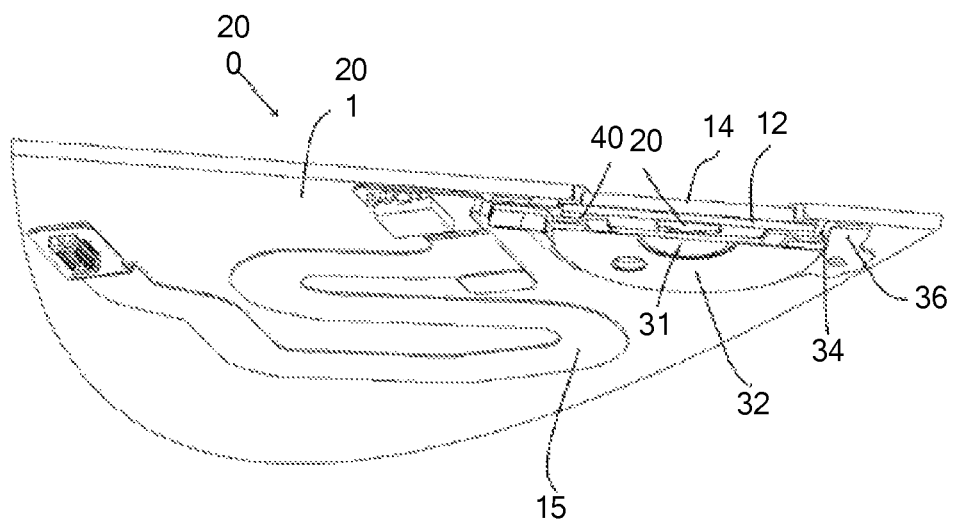
FIG. 2 is a schematic 3D diagram of the fingerprint module that is shown in FIG. 1 and that is mounted onto a touchscreen, a battery cover, or a rear cover of an electronic device.
Figure 3:
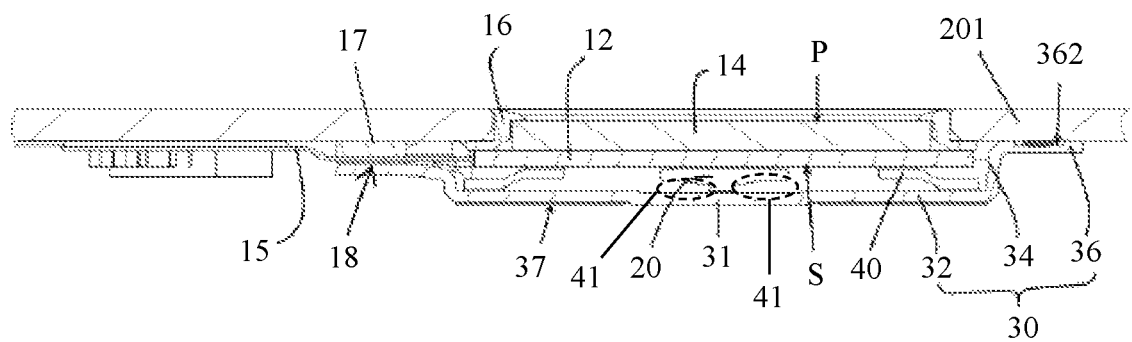
FIG. 3 is a sectional view of the fingerprint module that is shown in FIG. 1 and that is mounted onto a touchscreen, a battery cover, or a rear cover of an electronic device.

FIG. 1 shows a fingerprint module 100 provided in this application, and the fingerprint module 100 is mounted onto a touchscreen 201, a battery cover 201, or a rear cover 201 of an electronic device 200, as shown in FIG. 2 and FIG. 3.

Referring to FIG. 1, FIG. 2, and FIG. 3, the fingerprint module 100 includes a fingerprint component 10, a button component 20, a support 30, and a resilient fixing element 40.

The fingerprint component 10 includes a pressing surface P and a mounting surface S that are disposed in a back-to-back manner. In an implementation, the fingerprint component 10 includes a circuit board 12 and a fingerprint recognition chip 14 that is disposed on the circuit board 12. A surface that is of the fingerprint recognition chip 14 and that is not in contact with the circuit board 12 is the pressing surface P, and a surface that is of the circuit board 12 and that is not in contact with the fingerprint recognition chip 14 is the mounting surface S. The mounting surface S is a lower surface of the fingerprint component. The fingerprint module 10 further includes a flexible circuit board 15, and one end of the flexible circuit board 15 is electrically connected to the circuit board 12. Specifically, the circuit board 12 and the fingerprint recognition chip 14 are both disk-shaped, and the fingerprint recognition chip 14 is mounted in the center of the circuit board 14. The flexible circuit board 15 is configured to connect the circuit board 12 and a mainboard or another electronic element of the electronic device. A drive circuit configured to drive the fingerprint recognition chip is disposed on the flexible circuit board 15, and a connector is disposed at a location near an edge of the circuit board 12, and a connector that matches the connector on the circuit board 12 is disposed on the flexible circuit board 15, the flexible circuit board 15 and the circuit board 12 are electrically connected by using the connectors that cooperate with each other. The button component 20 is electrically connected to the mainboard of the electronic device by using the circuit board 12 and the flexible circuit board 15. When receiving a pressing force, the button component 20 moves, to trigger a circuit inside the button component 20 and implement a button function.

The fingerprint component 10 further includes a metal ring 16, the metal ring 16 is disposed on a periphery of the fingerprint recognition chip 14, a portion of the metal ring 16 is fastened to the circuit board 12, a portion of the metal ring 16 wraps an edge area that is of the fingerprint recognition chip 14 and that is on a side away from the circuit board 12. The metal ring 16 and the circuit board 12 are fastened by using a conductive adhesive, so that the metal ring 16 is electrically connected to a ground end of the circuit board 12. The metal ring 16 can not only protect an edge of the fingerprint recognition chip 14, but also has a decoration effect. In addition, the metal ring 16 can absorb static electricity of a human body, to prevent the static electricity from disturbing and destroying the fingerprint recognition chip 14.

The button component 20 is disposed on the mounting surface S (namely a lower surface of the fingerprint component 10). In this implementation, the fingerprint recognition chip 14 and the button component 20 are separately disposed on two sides of the circuit board 12. This may be directly fabricated by using an SMT technology, so that the fingerprint recognition chip 14 and the button component 20 are integrated as a whole. The button component 20 is disposed in a central area of the circuit board 12.

The resilient fixing element 40 is connected between the mounting surface S (namely the lower surface of the fingerprint component 10) and the support 30, the resilient fixing element 40 surrounds the button component 20. Specifically, the resilient fixing element 40 is disposed around the button component 20 and is distributed along the periphery of the button component 20 in a centrosymmetric manner. In an implementation, the resilient fixing element 40 may be an integrally ring-shaped structure, and the button component 20 is disposed in the centre of the resilient fixing element 40. In an implementation, the resilient fixing element 40 may include multiple resilient elements, and the multiple resilient elements are disposed around the button component 20, and are distributed along the periphery of the button component 20 in a centrosymmetric manner. In this case, there may be three, four, or more resilient elements, and the multiple resilient elements are symmetrically distributed along the periphery of the button component 20, to ensure that the bottom of the button component 20 is evenly supported. The support 30 includes a contact area 31 that is disposed opposite to the button component, and there is a gap 41 between the button component 20 and the support 30. When the pressing surface P receives a pressing force, the resilient fixing element 40 deforms, so that the gap 41 between the button component 20 and the support 30 becomes smaller, and the button component 20 comes in contact with the contact area 31. The support 30 is a rigid element, and a user is able to obtain a hand feeling of pressing in a process in which the button component 20 comes in contact with the contact area 31.

In an implementation, the support 30 includes a main body 32, a fixing rim 36, and a connecting arm 34. The connecting arm 34 is connected between the main body 32 and the fixing rim 36, the fixing rim 36 is configured to connect to another element of the electronic device 200, and the main body 32 is disposed opposite to the mounting surface S. In this implementation, the contact area 31 is located in a central area of the main body 32. In this implementation, the connecting arm 34 bends at an edge of the main body 32 in a direction facing the fingerprint component 10, the connecting arm 34 may be perpendicular to a surface on which the main body 32 is located, the fixing rim 36 bends at an edge that is of the connecting arm 34 and that is away from the main body 32, and the fixing rim 36 and the main body 32 are separately located on two ends of the connecting arm 34. In this implementation, the support 30 is fastened to the touchscreen 201, the battery cover 201, or the rear cover 201 of the electronic device 200 by using the fixing rim 36 (as shown in FIG. 2 and FIG. 3). To facilitate positioning of the fingerprint module 100 itself, for example, an auxiliary positioning hole H (as shown in FIG. 1) may be added on the fixing rim 36. With the auxiliary positioning hole H, a concentricity of the fingerprint component 10, the button component 20, and the like can be ensured during assembly of the fingerprint module 100. The support 30 may be integrally molded by using a sheet metal part, or the support 30 may be a plastic part.

Specifically, referring to FIG. 3, an adhesive overflow groove 362 is disposed on the fixing rim 36, and is configured to fasten the support 30 to another element 201 (the touchscreen, the battery cover, or the rear cover) of the electronic device 200 in a manner of adhesive dispensing. An adhesive dispensing technology not only helps reduce a mounting gap or a tolerance between the fingerprint module 100 and the another element, but also can make use of waterproof sealing performance of a sealing sealant to improve waterproof sealing performance of the fingerprint module 100 and enhance lifetime and security of the fingerprint module 100.

Further, the connecting arm 34 surrounds the main body 32 and forms an enclosure along with the main body 32. The button component 20 and the resilient fixing element 40 are both accommodated in the enclosure. That is, the connecting arm 34 forms a ring-shaped structure, the main body 32 is located at the bottom of the connecting arm 34, and the fixing rim 36 is formed on an external side of the top of the connecting arm 34.

In an implementation, as shown in FIG. 3, the support 30 is an integrally-molded metal structure, an insulation layer 37 is disposed on a surface that is of the main body 32 and that is not in contact with the fingerprint component 10. In an implementation, the insulation layer 37 is an insulation sheet, such as a mylar (Mylar) sheet, the insulation layer 37 is adhered to a surface of the main body by using an adhesive, or the insulation layer 37 may be formed on the surface of the main body 32 in a manner of disposing an insulation coating. The insulation layer 37 is adhered to a surface of the main body, or the insulation layer 37 may be formed by insulation coating on the surface of the main body 32 by using an adhesive. The insulation layer 37 is used to isolate the support 30 from an electronic element or the mainboard inside the electronic device, so as to prevent static electricity from passing through the support 30 and destroying the electronic element or the mainboard.

Figure 4:
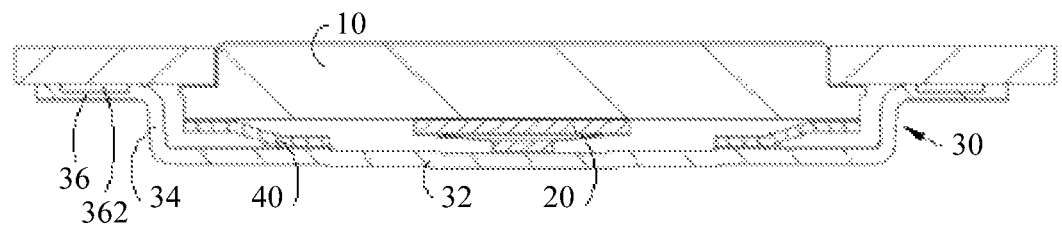
FIG. 4 is a sectional view, in another direction, of the fingerprint module that is shown in FIG. 1 and that is mounted onto a touchscreen, a battery cover, or a rear cover of an electronic device.

With reference to FIG. 1, FIG. 3, and FIG. 4, a main body of the fixing rim 36 is in a ring-shaped enclosing structure, and a main body of the adhesive overflow groove 362 is also a ring-shaped groove. To form a connection channel to the electronic device so that the flexible circuit board 15 extends from the circuit board 12 to an external side of the support 30, an outlet 38 is disposed on the support 30, and a plane fixing rim and a relatively low connecting arm 34 are formed at a corresponding location of the outlet 38, where the plane fixing rim has no adhesive overflow groove 362 and has a width equivalent to a width of the outlet 38 is formed. The flexible circuit board 15 passes through the outlet 38 and is fastened to the fixing rim 36 by using a conductive adhesive 18, and the flexible circuit board 15 is adhered to the electronic device 200 by using a sealing material 17 (such as a PET membrane), so as to form a waterproof structure between the flexible circuit board 15 and the support 30.

In an implementation, the resilient fixing element 40 is waterproof rubber (rubber), the waterproof rubber surrounds the button component 20, the waterproof rubber 40 and the fingerprint component 10 are fastened by using a waterproof adhesive, and the waterproof rubber 40 and the support 30 are also fastened by using a waterproof adhesive. A cross section of the resilient fixing element 40 may be in a shape of a Chinese character "几" or may be in a "Z" shape. An end face of the resilient fixing element 40 is fastened to a surface of the circuit board 12 of the fingerprint component 10 by using a waterproof adhesive.

Specifically, the fingerprint module 100 is generally of a disk-shaped structure (excluding the flexible circuit board), the fingerprint component 10 of the fingerprint module 100 is disk-shaped, and the resilient fixing element 40 is ring-shaped.

In this application, the fingerprint component 10 and the button component 20 are integrated into the fingerprint module 100, and the support 30 and the fingerprint component 10 are combined by using the resilient fixing element 40. In this case, before the fingerprint component 10 is assembled into the electronic device 200, a hand feeling of pressing the button component 20 can be tested. This ensures that assembly is performed only after a desired test result is obtained. In addition, an integrated structure simplifies an assembly process for a production line, and using an integrated module as an incoming material helps reduce related parts that are required during assembly of the fingerprint module 100. During the assembly, the support 30 is directly fastened to the touchscreen, the battery cover, or the rear cover. Moreover, the button component 20 is mounted onto the fingerprint component 10 by using an SMT technology, so that there is no gap between the button component 20 and the fingerprint component 10. This can reduce a stuck fingerprint button or a back-lash upon pressing. The fingerprint component 10 is connected to the touchscreen, the battery cover, or the rear cover of the electronic device by using the support 30 of the electronic device.

The fingerprint module 100 in this application is applied to the electronic device 200. This helps the electronic device 200 become lighter and thinner, also simplifies assembly of the electronic device 200, and reduces assembly costs. For example, the electronic device may be various devices that require fingerprint recognition, such as a mobile phone, a tablet computer, a notebook computer, a UMPC (Ultra-mobile Personal Computer, ultra-mobile personal computer), a netbook, a PDA (Personal Digital Assistant, personal digital assistant), and an industry device.

Finally, it should be noted that the foregoing embodiments are merely intended to describe the technical solutions of this application, but not to limit this application. Although this application is described in detail with reference to the foregoing embodiments, a person of ordinary skill in the art should understand that the descriptions are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A fingerprint module, the fingerprint module comprising a fingerprint component, a button component, a support, and a resilient fixing element, wherein:

the button component is fastened to a lower surface of the fingerprint component, wherein the lower surface of the fingerprint component is a circuit board, wherein an upper surface of the fingerprint component is a fingerprint recognition chip, wherein the fingerprint component further comprises a metal ring, wherein the metal ring is disposed on a periphery of the fingerprint recognition chip, and wherein the metal ring is electrically connected to a ground end of the circuit board;

the resilient fixing element is disposed on the lower surface of the fingerprint component and is located between the fingerprint component and the support, wherein the resilient fixing element surrounds the button component, and wherein the resilient fixing element resiliently connects the fingerprint component and the support, wherein a gap exists between the button component and the support;

when the fingerprint component is pressed, the resilient fixing element deforms, the gap becomes smaller, and the button component comes in contact with the support;

an upper surface of the button component contacts the lower surface of the fingerprint component;

the upper surface of the button component is within an enclosure of the support; and the support comprises a main body, a connecting arm, and a fixing rim, wherein the connecting arm connects the main body and the fixing rim, wherein the main body is disposed opposite to the button component, and wherein the connecting arm is perpendicular to the main body.

2. The fingerprint module according to claim 1, wherein the fixing rim is configured to connect to an electronic device.

3. The fingerprint module according to claim 2, wherein an adhesive overflow groove is disposed on the fixing rim, and wherein the adhesive overflow groove is configured to fasten the support to the electronic device in a manner of adhesive dispensing.

4. The fingerprint module according to claim 2, wherein the connecting arm surrounds the main body and forms the enclosure along with the main body, and wherein the button component and the resilient fixing element are both accommodated in the enclosure.

5. The fingerprint module according to claim 2, wherein the support is of an integrally-molded metal structure, wherein an insulation layer is disposed on a surface that is of the main body and that is not in contact with the button component, and wherein the insulation layer is used to prevent static electricity from passing through the support and damaging the electronic device.

6. The fingerprint module according to claim 5, wherein the insulation layer is formed on the surface in a manner of disposing an insulation coating.

7. The fingerprint module according to claim 5, wherein the insulation layer is a Mylar sheet.

8. The fingerprint module according to claim 1, wherein the fingerprint module further comprises a flexible circuit board, wherein one end of the flexible circuit board is electrically connected to the circuit board, and wherein the button component is electrically connected to a mainboard of an electronic device by using the circuit board and the flexible circuit board.

9. The fingerprint module according to claim 8, wherein an outlet is disposed on the support, wherein the outlet is used by the flexible circuit board to extend from the circuit board to an external side of the support, wherein the outlet is filled with a sealing material, and wherein a waterproof structure is formed between the flexible circuit board and the support.

10. The fingerprint module according to claim 8, wherein a portion of the metal ring is fastened to the circuit board, and wherein a portion of the metal ring wraps an edge area on a side that is of the fingerprint recognition chip and that is away from the circuit board.

11. The fingerprint module according to claim 1, wherein the resilient fixing element is waterproof rubber, wherein the waterproof rubber surrounds the button component, wherein the waterproof rubber and the fingerprint component are fastened by using a waterproof adhesive, and wherein the waterproof rubber and the support are fastened by using a waterproof adhesive.

12. An electronic device, the electronic device comprising a fingerprint module, wherein the fingerprint module comprises a fingerprint component, a button component, a support, and a resilient fixing element, wherein:
   the button component is fastened to a lower surface of the fingerprint component, wherein the lower surface of the fingerprint component is a circuit board, wherein an upper surface of the fingerprint component is a fingerprint recognition chip, wherein the fingerprint component further comprises a metal ring, wherein the metal ring is disposed on a periphery of the fingerprint recognition chip, and wherein the metal ring is electrically connected to a ground end of the circuit board;
   the resilient fixing element is disposed on the lower surface of the fingerprint component and is located between the fingerprint component and the support, wherein the resilient fixing element surrounds the button component, and wherein the resilient fixing element resiliently connects the fingerprint component and the support, wherein a gap exists between the button component and the support;
   when the fingerprint component is pressed, the resilient fixing element deforms, the gap becomes smaller, and the button component comes in contact with the support;
   an upper surface of the button component contacts the lower surface of the fingerprint component;
   the upper surface of the button component is within an enclosure of the support; and
   the support comprises a main body, a connecting arm, and a fixing rim, wherein the connecting arm connects the main body and the fixing rim, wherein the main body is disposed opposite to the button component, and wherein the connecting arm is perpendicular to the main body.

13. The electronic device according to claim 12, wherein the fixing rim is configured to connect to an electronic device.

14. The electronic device according to claim 13, wherein an adhesive overflow groove is disposed on the fixing rim, wherein the adhesive overflow groove is configured to fasten the support to the electronic device in a manner of adhesive dispensing.

15. The electronic device according to claim 13, wherein the connecting arm surrounds the main body and forms the enclosure along with the main body, and wherein the button component and the resilient fixing element are both accommodated in the enclosure.

16. The electronic device according to claim 13, wherein the support is of an integrally-molded metal structure, wherein an insulation layer is disposed on a surface that is of the main body and that is not in contact with the button component, and wherein the insulation layer is used to prevent static electricity from passing through the support and damaging the electronic device.

17. The electronic device according to claim 12, wherein the fingerprint module further comprises a flexible circuit board, wherein one end of the flexible circuit board is electrically connected to the circuit board, and wherein the button component is electrically connected to a mainboard of the electronic device by using the circuit board and the flexible circuit board.

18. The electronic device according to claim 17, wherein an outlet is disposed on the support, wherein the outlet is used by the flexible circuit board to extend from the circuit board to an external side of the support, wherein the outlet is filled with a sealing material, and wherein a waterproof structure is formed between the flexible circuit board and the support.

19. The electronic device according to claim 17, wherein a portion of the metal ring is fastened to the circuit board, and wherein a portion of the metal ring wraps an edge area on a side that is of the fingerprint recognition chip and that is away from the circuit board.

20. The electronic device according to claim 12, wherein the resilient fixing element is waterproof rubber, wherein the waterproof rubber surrounds the button component, wherein the waterproof rubber and the fingerprint component are fastened by using a waterproof adhesive, and wherein the waterproof rubber and the support are fastened by using a waterproof adhesive.

\* \* \* \* \*